United States Patent [19]

Bhagavatula et al.

[11] Patent Number: 4,494,968
[45] Date of Patent: Jan. 22, 1985

[54] METHOD OF FORMING LAMINATED SINGLE POLARIZATION FIBER

[75] Inventors: Venkata A. Bhagavatula, Corning; Donald B. Keck, Big Flats, both of N.Y.

[73] Assignee: Corning Glass Works, Corning, N.Y.

[21] Appl. No.: 538,325

[22] Filed: Oct. 3, 1983

[51] Int. Cl.³ .................. C03B 37/075; G02B 5/172
[52] U.S. Cl. ...................... 65/3.12; 65/3.11; 350/96.33
[58] Field of Search .............. 65/3.11, 3.12; 350/96.29, 96.30, 96.33

[56] References Cited

U.S. PATENT DOCUMENTS

| | | | |
|---|---|---|---|
| 3,980,459 | 9/1976 | Li | 350/96.3 X |
| 3,982,916 | 9/1976 | Miller | 350/96.3 X |
| 4,243,398 | 1/1981 | Nomura et al. | 65/3.12 X |
| 4,265,515 | 5/1981 | Kao | 350/96.33 |
| 4,360,371 | 11/1982 | Blankenship et al. | 65/3.12 X |
| 4,372,648 | 2/1983 | Black | 350/96.33 |
| 4,395,270 | 7/1983 | Blankenship et al. | 65/3.12 X |
| 4,415,230 | 11/1983 | Keck | 350/96.33 |

*Primary Examiner*—Kenneth M. Schor
*Attorney, Agent, or Firm*—W. J. Simmons

[57] ABSTRACT

A process for manufacturing a preform from which is drawn an optical fiber, the core of which comprises layers of different glass composition. Layers of glass, adjacent ones of which have different composition, are deposited on a substrate. A process is preferred whereby layers of glass soot are deposited. The soot is consolidated and the resultant laminated glass structure is severed to form an elongated azimuthally asymmetric laminated core structure. A layer of cladding glass is added to the core structure, and the resultant preform is drawn into an optical fiber.

22 Claims, 14 Drawing Figures

METHOD OF FORMING LAMINATED SINGLE POLARIZATION FIBER

BACKGROUND OF THE INVENTION

The present invention relates to optical fibers. More particularly, it relates to a method for manufacturing a single-mode optical fiber in which the core is formed of laminae, adjacent ones of which have different refractive indices.

In certain applications of single-mode optical waveguide fibers, e.g. gyroscopes, sensors and the like, it is important that the propagating optical signal retain the polarization characteristics of the input light in the presence of external depolarizing perturbations. This requires the fiber to have an azimuthal asymmetry of the refractive index profile. copending application Ser. No. 499,898 entitled "Polarization Retaining Single-Mode Optical Waveguide" filed in the name of V. A. Bhagavatula et al. on June 1, 1983 describes a fiber, the core of which is formed of a plurality of laminae of transparent material, adjacent ones of which have different refractive indices. It would be advantageous to form the core of such a fiber by a chemical vapor deposition (CVD) technique so that the fiber is suitable for transmitting optical signals over long distances.

Methods of forming optical fibers having an azimuthal asymmetry of the refractive index profile are disclosed in U.S. Pat. No. 3,980,459 (Li) and U.S. Pat. No. 3,982,916 (Miller), and in U.S. patent application Ser. No. 500,004, "Method of Forming Optical Fiber Having Laminated Core" (A. Sarkar) filed June 1, 1983. One or more layers are formed on the inner surface of a substrate tube by flowing a reactant vapor through the tube and heating the tube and contained vapor mixture with a moving heat source, external to the substrate tube, such that a suspension of glass particles is produced within the substrate tube, the particles traveling downstream and being fused to form a continuous glassy deposit on the inner surface. An asymmetric structure is formed by inserting a rod into the substrate tube or by asymmetrically heating the substrate tube to preferentially deposit glass particles on a specific region of the tube.

SUMMARY OF THE INVENTION

It is an object of the present invention to provide a method forming an optical fiber preform having an azimuthally asymmetric core region comprising laminations of glass, adjacent ones of which have different physical and/or optical characteristics.

Briefly, the present invention relates to a method of forming an optical fiber. Such a method conventionally comprises the steps of providing an elongated core structure and applying a coating of cladding glass particles to the core structure. The structure so formed is consolidated and drawn into an optical fiber. In accordance with the present invention the step of providing a core structure is characterized in that it comprises forming on a substrate a laminated glass structure, adjacent glass lamina of which have different refractive indices, and thereafter severing from the substrate at least one core structure, the glass lamina of which are azimuthally asymmetric.

DETAILED DESCRIPTION OF THE INVENTION

Figure 1:
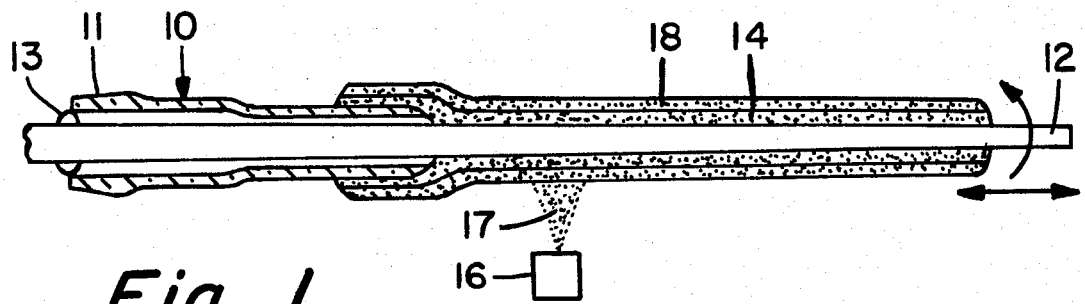
FIGS. 1 and 2 illustrate the application of successive coatings of glass soot to a mandrel.

It is to be noted that the drawings are illustrative and symbolic of the present invention and there is no intention to indicate the scale or relative proportions of the elements shown therein.

Glass particles referred to herein as soot are generated by means such as a flame hydrolysis burner. The soot is directed onto a substrate such as a cylindrical mandrel or a planar sheet. By changing the composition of the soot, a layered structure can be built up wherein adjacent layers have different refractive indices. As a matter of convenience, every other layer may have the same refractive index, but this is not a necessity. It is only necessary that adjacent layers have different refractive indices. After a sufficient number of layers has been built up, the soot is consolidated to form a dense glass article free from particle boundaries. When a cylindrical substrate is employed as the mandrel, it is usually removed prior to consolidation, although removal of the mandrel is not a necessity. When a planar substrate is employed, it may be more convenient to consolidate the soot on the substrate and thereafter remove the substrate by grinding, etching or the like. From the resultant tubular or planar article there is formed one or more elongated, laminated core structure in which the laminae extend throughout the lengths of the preforms. Each core structure is inserted into a lathe and rotated and translated with respect to a soot deposition means which applies a coating of cladding soot. Reference herein to translating a substrate with respect to a soot stream means translating the substrate, translating the soot stream, or some combination thereof. The resultant composite preform can be drawn directly into an optical fiber, or it can be initially consolidated to form a final preform which is drawn into fiber. Consolidation is preferably carried out in the presence of a halogen such as chlorine which dries the soot as it sinters.

The resultant fiber is a single polarization single-mode optical waveguide of the type taught in the aforementioned Bhagavatula et al. application. Such a fiber functions to retain input polarization only if the core laminae have a thickness less than the wavelength $\lambda$ of the light propagating therethrough. Such a thickness can be achieved by controlling the thicknesses of the deposited soot layers and by drawing or elongating those layers a sufficient amount from the time the soot is deposited until the final fiber is formed. For example, a core drilled core preform having a diameter greater than 10 mm can be heated and stretched into a rod or intermediate fiber having a cross-sectional dimension of about 4 to 10 mm prior to adding the cladding soot. The cladding soot is then deposited to a sufficient thickness to ensure that the thickness of each lamina in the resultant optical fiber is less than $\lambda$. The steps of overcladding and drawing can be performed any number of times as required to obtain the desired laminae thickness.

Rather than depositing layers of soot, alternate ones of which have different refractive indices, it may be possible to take advantage of the variation in composition and in refractive index which naturally occurs during the deposition of a layered soot structure. As taught in the publications N. Yoshioka et al. "Graded Index Profile Formation and Transmission Characteristics of VAD Fiber", Paper No. 2, 6th ECOC, York, United Kingdom, 1980, pp. 10-13 and Okamoto et al. Applied Optics, Vol. 20, No. 13, July 1, 1981, pp. 2314-2318, the concentration of a dopant oxide such as $GeO_2$ in a deposited soot layer depends, inter alia, upon the temperature of the substrate. As the soot stream from a flame hydrolysis burner advances along a substrate, the temperature of the substrate at the trailing portion of the soot stream is hotter than the temperature of the leading portion thereof. This temperature variation produces compositional variations within each layer of deposited soot. The effect of such compositional variations within a single soot layer is the formation of a structure having alternate layers of high and low refractive index. If this effect does not result in a great enough difference in refractive index between the high index and the low index regions of a deposited layer, a core formed by this technique can be employed in a fiber having additional polarization retaining characteristics such as stress rods at diametrically opposed sides of the core, an elliptically-shaped inner cladding surrounded by an outer stress cladding, or the like.

Following is a more detailed description of various methods of forming laminated core, single-mode optical fibers by CVD techniques. Since the resultant fibers are formed entirely of vapor deposited glass, extremely low values of attenuation are possible.

Figure 2:
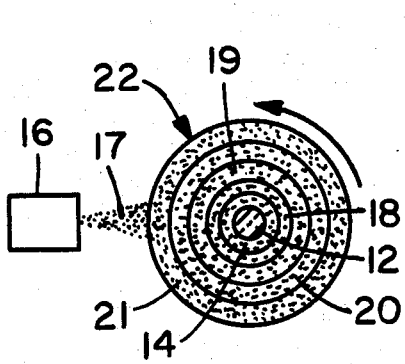

A porous preform may be formed in accordance with the method illustrated in FIGS. 1 and 2. A handle 10 of the type disclosed in U.S. Pat. No. 4,289,522 may be employed. Handle 10 is a tubular member having a ground glass joint 11 at the one end thereof. The large diameter end of a tapered mandrel 12 extends through handle 10 and is secured thereto by shims 13. The ends of the mandrel are mounted in a lathe where it is rotated and translated as indicated by the arrows. The mandrel may be initially coated with carbon soot to facilitate removal of the soot preform.

Fuel gas and oxygen or air are supplied to burner 16 from a source (not shown). This mixture is burned to produce a flame which is emitted from the burner. A gas-vapor mixture is oxidized within the flame to form a soot stream 17 which is directed toward mandrel 12. Suitable means for delivering the gas-vapor mixture to the burner are well known in the art; for an illustration of such means reference is made to U.S. Pat. Nos. 3,826,560, 4,148,621 and 4,173,305. For an illustration of suitable burners, reference is made to U.S. Pat. Nos. 3,565,345, 3,698,936 and 4,165,223. Soot deposition means 16 may also comprise nozzles such as those disclosed in U.S. Pat. No. 3,957,474 which emit reactant vapors which are heated by means such as a laser beam to form a soot stream.

A first coating 14 of soot is applied to mandrel 12 while it is rotated and translated for uniform deposition of the soot. Generally, each coating of glass soot is formed of a plurality of layers of soot, each layer being formed by a single pass of the burner along the length of mandrel 12. Coating 14 may consist of a low expansion material such as pure $SiO_2$, as taught in U.S. Pat. No. 4,344,670, to enhance preform strength. A coating 18 of suitable composition for forming one of the core laminae is deposited over coating 12. As shown in FIG. 2, additional coatings 19, 20 and 21 are deposited over coating 18. Alternate layers may have the same refractive index and are separated by layers of different refractive index. More specifically, layers 18 and 20 may have a first value of refractive index, and layers 19 and 21 may have a second value of refractive index different from the first value. Additional coatings of different refractive index may be deposited until a porous core preform 22 having the desired number of coatings has been formed.

In accordance with well known practice the refractive index of coatings 18 and 20 is made different from that of coatings 19 and 21 by changing the composition of the soot being produced in flame 17. This can be accomplished by changing the concentration or type of dopant material being introduced into the flame, or by omitting the dopant material.

After deposition of particulate soot material to the extent required to form porous core preform 22, mandrel 12 may be removed from the assembly by pulling it out through handle 10, thereby leaving a longitudinal aperture. Integral handle 10 provides a support for subsequent handling and processing.

The ground glass joint portion of handle 10 is secured into a complimentary female ground glass joint member, whereby drying gas may be flowed through handle 10, into the preform aperture and outwardly through the preform interstices. The steps of drying and consolidating may be performed in accordance with the teachings of U.S. Pat. No. 4,125,388, which patent is hereby expressly incorporated by reference. As taught by said patent, drying may be accomplished before or during the consolidation step. Even though drying is facilitated by removing the mandrel from the soot preform to provide an aperture into which drying gas is flowed, the soot preform may be consolidated on the mandrel. If the mandrel is to remain during consolidation, handle 10 need not be employed.

Figure 3:
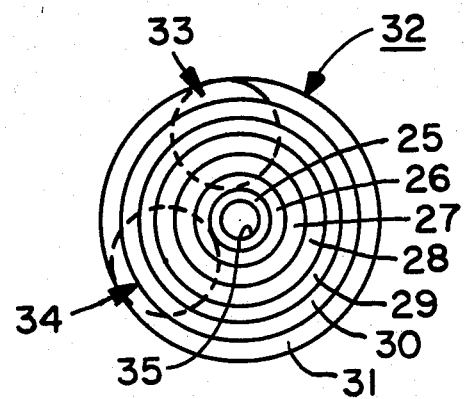
FIG. 3 is a cross-sectional view of a consolidated core preform showing the locations of some of the core drilled sections that can be removed therefrom.

After consolidation, an aperture 35 usually remains in consolidated core preform 32 as shown in FIG. 3. If low expansion soot coating 14 is employed, it forms a compressively-stressed glass layer 25. Soot coatings 18 and 20 form glass layers 26 and 28 which have a given refractive index, and coatings 19 and 21 form glass layers 27 and 29 which have a refractive index different from the given refractive index. Also shown in FIG. 3 are layers 30 and 31 which are representive of the additional layers that can be formed by depositing additional soot coatings of suitable composition. The refractive indices of layers 30 and 31 would be the same as those of layers 28 and 29, respectively.

As indicated by the dashed line circles in FIG. 3, a plurality of longitudinal core structures 33, 34 are core drilled from consolidated preform 32. It is noted that the curvature of each of the laminae increases with decreasing radius thereof within consolidated preform 32. Thus, the amount of curvature within the core drilled sections can be reduced by employing a larger mandrel. Each core drilled section is etched and rinsed, and the ends thereof are mounted in a lathe where it is rotated and translated while a coating of cladding soot is deposited on the surface thereof. The diameter of each core drilled section of preform is preferably in the range of 4 mm to 10 mm. If the diameter of a core drilled section is greater than 10 mm, it may be desirable to stretch it by a drawing process similar to that by which the final optical fiber is drawn to reduce the diameter to a value within the aforementioned range. While core structure 33 rotates and translates, a coating 37 of cladding soot is deposited thereon by a conventional flame hydrolysis process similar to that disclosed in U.S. Pat. Nos. 3,737,292 and 4,165,223. The composition of soot coating 37 is such that the refractive index of the cladding glass of the resultant fiber will be lower than the average refractive index of the core laminae.

The flame hydrolysis-produced cladding layer is porous in form and must be heated to fuse or consolidate it into a glass layer free from particle boundaries. Consolidation is preferably accomplished by gradually inserting the composite body 38 into a consolidation furnace in the manner taught in U.S. Pat. No. 3,933,454. A drying gas such as chlorine preferably flows through the furnace during consolidation of the cladding soot.

Figure 5:
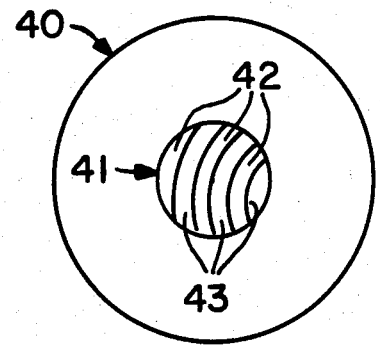
FIG. 5 is a cross-sectional view of a consolidated blank.

The resultant consolidated preform is inserted into a draw furnace wherein at least an end thereof is heated to a temperature that is sufficiently high to permit fiber to be drawn therefrom in accordance with conventional practice. High silica content preforms are heated to approximately 2000° C. This structure can then be drawn to the final fiber diameter. As shown in FIG. 5, the resultant fiber 40 comprises a core 41 which is formed of alternate laminae 42 and 43 of glass having different refractive index. The thicknesses of laminae 42 and 43 must be less than the wavelength of light to be propagated through the fiber for the fiber to have the beneficial polarization retention properties described in the aforementioned Bhagavatula et al. application.

Figure 6:
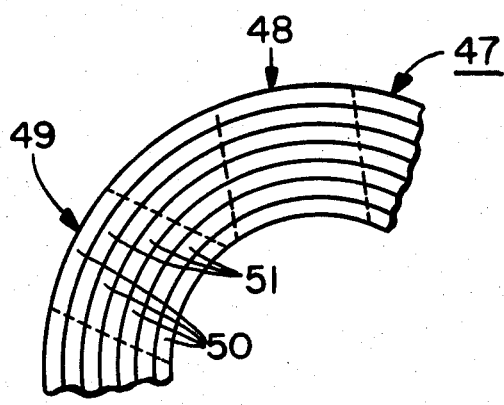
FIG. 6 is a cross-sectional view of a consolidated core preform illustrating that sections may be cut therefrom.

FIG. 6 illustrates an embodiment wherein a consolidated core preform 47 is cut by means of a diamond saw or the like along the dashed lines to form a plurality of longitudinally extending core structures 48 and 49, each of which comprises a plurality of layers 50 and 51. The refractive index of layers 50 is different from that of layers 51. The sharp edges of a core structure may be removed by grinding or etching, this step being optional.

Figure 4:
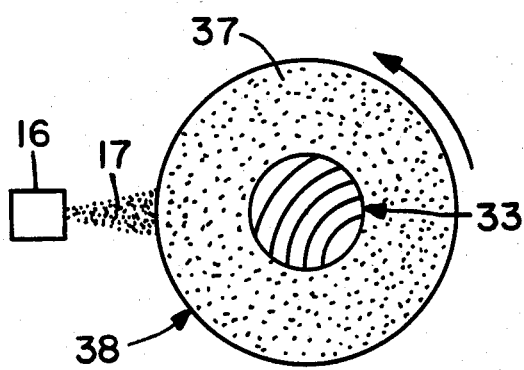
FIG. 4 illustrates the application of cladding soot to a core drilled section.
Figure 7:
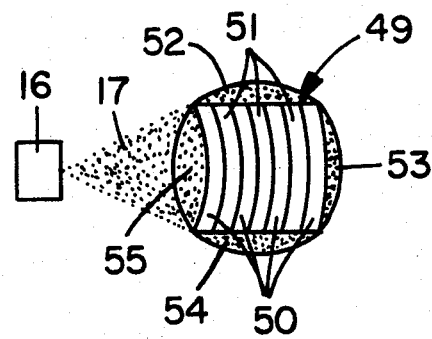
FIG. 7 illustrates the application of a coating of cladding soot to a core section cut from the preform of FIG. 6.

Referring to FIG. 7 core structure 49 is mounted in a lathe (not shown). As in the previous example, the average cross-sectional dimension of core structure 49 is preferably between 4 mm and 10 mm. In accordance with one technique for forming the cladding layer, longitudinal strips 52, 53, 54 qnd 55 are initially deposited on the sidewalls of core structure 49 to accelerate the formation of a circular outer cladding. With the lathe halted, burner 16 makes a sufficient number of longitudinal passes to form a soot layer 52. Core structure 49 is rotated 90°, and a second soot layer 53 is deposited. This is repeated two more times, and strips 54 and 55 are deposited. Core structure 49 is then continually rotated and traversed longitudinally with respect to the burner while an outer layer of cladding soot is deposited as described in conjunction with FIG. 4.

The steps of depositing strips 52, 53, 54 and 55 of cladding glass may be omitted without affecting to too great an extent the geometry of the resultant fiber. If the outer cladding layer is deposited directly upon core structure 49, it is thought that substantial circularity of the outer surface of the soot will be achieved when the outside diameter of the cladding soot coating is sufficient, relative to the size of the core, to enable the resultant fiber to function as a single-mode fiber. The resultant composite preform is consolidated to form a draw blank which may not be circular if layers 52 to 55 are not applied or if they are applied in such a fashion that they do not balance the initial non-circularity of core structure 49. The amount that the outer surface of consolidated blank deviates from circularity decreases with increasing amounts of outer cladding. During the drawing of fiber from the resultant consolidated draw blank, surface tension tends to round the outer surface thereof.

Figure 8:
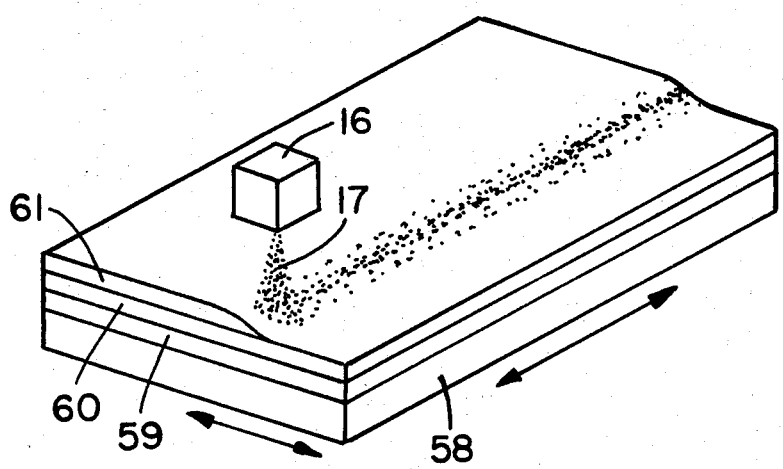
FIG. 8 is a fragmentary oblique illustration of the application of a soot coating to a substrate in the formation of a planar core preform.

An embodiment wherein the laminae are formed on a planar substrate 59 is illustrated in FIG. 8. Two soot coatings 59 and 60 have been deposited on substrate 58, and a third soot coating 61 is being deposited by burner 16. The refractive index of coating 61 is the same as that of coating 59 but different from that of coating 60. Substrate 58 may be formed of any suitable material such as glass, ceramic or the like, the characteristics of which are compatable with those of the deposited coatings.

Substrate 58 is suitably mounted in the path of stream 17 and caused to translate in both the forward and backward as well as the side to side directions to permit the application of coating 61 over previously deposited coating 60. Suitable means for translating substrate 58 in both directions may be any means known in the art of accomplishing this purpose such for example as a milling machine bed or a dual motorized platform with a chuck mounting for the substrate. The limits of translated movements are controlled by microswitches linked to reversing motor drive systems.

It is to be understood that an elongated ribbon burner that provides a long stream of soot could be used in place of the burner illustrated in the drawing whereby the substrate would require translation in one direction only. Further, a plurality of burners could be employed in a row to similarly require translation in one direction only. A plurality of burners suitably spaced over the entire area of the substrate, to which it is desired to apply a coating, would eliminate the need for any translation of the substrate.

When the soot coatings are applied by means of a flame hydrolysis method, the deposited soot must be sintered either simultaneously with the deposition thereof or by a subsequent operation to provide a uniform and dense material. If the soot does not consolidate during deposition, a soot coating may be consolidated and its exterior surface suitably finished, if necessary, before the next soot coating is applied. Alternatively, all soot coatings may be simultaneously consolidated. As discussed hereinabove, the consolidation process is preferably performed in an atmosphere including a drying gas.

Figure 9:
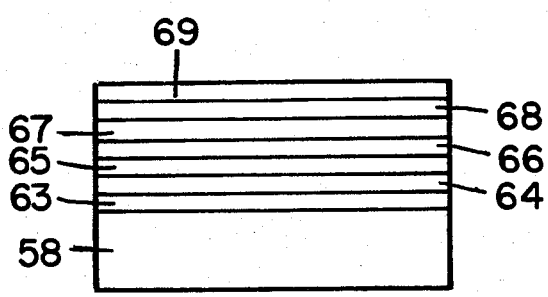
FIG. 9 is a cross-sectional view of a consolidated planar preform.

A consolidated preform is shown in cross-section in FIG. 9. Dense glass layers 63 through 69 are disposed on a planar surface of substrate 58. Alternately disposed layers 63, 65, 67 and 69 may have a first value of refractive index, and the refractive index of layers 64, 66 and 68 may be a second value that is different from the first value.

Figure 10:
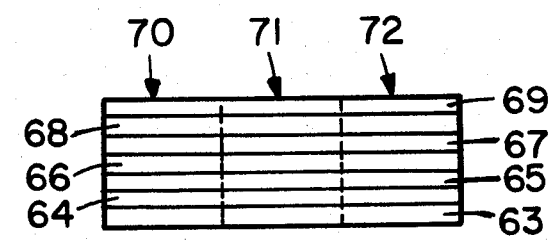
FIG. 10 is a cross-sectional view of a laminated core structure formed by removing the substrate from the preform of FIG. 9.

Substrate 58 may be removed by grinding, etching or the like to form the laminated structure of FIG. 10. This laminated structure may be severed by means such as a diamond saw along the dashed lines to form a plurality of laminated core structures 70, 71 and 72. These core structures may be mounted in a lathe and provided with a coating of cladding soot in the manner described in conjunction with FIG. 7. Prior to coating a laminated core preform 70 with cladding soot, the cross-sectional configuration of the preform can be rounded by grinding the preform or by immersing it in an abrasive slurry or other medium which preferentially removes the edges thereof when the preform is rotated therein about its longitudinal axis. One such method is known as centerless grinding. Thus, there can be generated various cross-sectional shapes including elliptical and circular.

Figure 11:
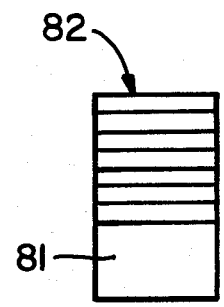
FIG. 11 is a cross-sectional view of a modified consolidated planar preform.

If a suitably narrow, elongated planar substrate 81 is employed, a consolidated planar preform of the type illustrated in FIG. 11 can be formed. After substrate 81 is removed, a single laminated core preform 82 remains. This embodiment eliminates the need to sever a consolidated preform into a plurality of core structures.

Figure 12:
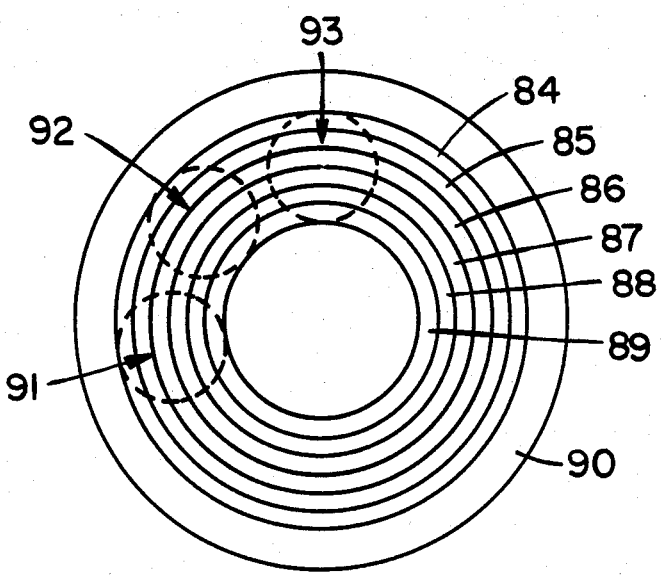
FIG. 12 is a cross-sectional view of a preform formed by depositing glass layers on the inner surface of a tube, and showing locations of core drilled sections that can be removed therefrom.

As shown in FIG. 12, a laminated glass article could also be formed by depositing layers 84 through 89 of glass on the inner surface of a glass tube as taught in U.S. Pat. No. 4,298,364. Adjacent layers have different refractive indices as discussed above. Core structures 91, 92 and 93 are core drilled from the resultant article.

Figure 13:
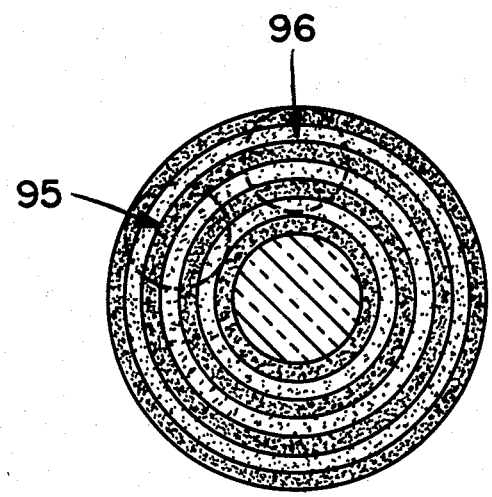
FIGS. 13 and 14 are cross-sectional views of circular and planar porous preforms, sections of which can be severed and thereafter consolidated to form core structures.
Figure 14:
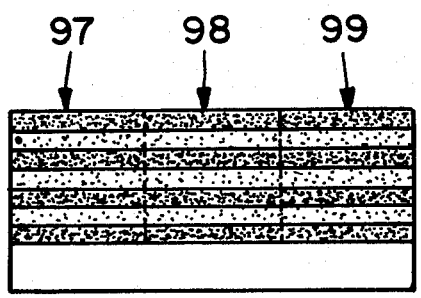

If the TCE differential between adjacent layers is relatively high, it may be advantageous to core drill or otherwise sever the core structures from a soot preform that has not yet been consolidated. As shown in FIGS. 13 and 14, a plurality of soot coatings are deposited on substrates that are cylindrical and planar, respectively. As illustrated by different dot densities, adjacent coatings have different refractive indices. Porous glass core structures 95 and 96 can be core drilled from the soot preform of FIG. 13. Porous glass core structures 97, 98 and 99 can be sawed from the soot preform of FIG. 14. These porous glass core structures are then consolidated and overclad with cladding glass as described above. The consolidated core structure may receive a surface treatment such as grinding, etching or the like prior to depositing the cladding thereon.

Whereas reference is made herein to forming a porous preform by directing a stream of glass particles from a burner or nozzle onto a substrate, the present invention also contemplates the formation of layers of glass particles by casting suspensions of fumed oxides. A suitable casting technique is disclosed in European patent application publication No. 0084438, published July 27, 1983.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics.

To maximize the polarization retention effect, the refractive index difference between adjacent core laminae should be maximized. Also, care must be taken to maintain the thermal coefficient of expansion (TCE) difference and softening point temperature difference between adjacent laminae within acceptable limits. For example, if adjacent laminae were formed of pure $SiO_2$ and $SiO_2$ doped with 16 mole percent $GeO_2$ the difference between refractive indices of the two compositions would be about 0.023. However, the TCE differential would be about $20 \times 10^{-7}$ per degree C. Such a large TCE differential could give rise to fabrication difficulties in that high rates of breakage could occur during core drilling or sawing of laminated structures. Although it is presently preferred that the TCE differential be maintained below $15 \times 10^{-7}$ per degree C., it is thought that the actual limit of the TCE differential may be greater than $15 \times 10^{-7}$ per degree C. depending upon the care taken to sever the core structure and the equipment employed.

The core laminae can be formed of various glass compositions which result in large refractive index differentials without an unacceptable mismatch of physical characteristics. If a first core laminae composition were $SiO_2$ doped with 20 mole percent $P_2O_5$ and a second core laminae composition were $SiO_2$ doped with 20 mole percent $B_2O_3$ a refractive index differential of about 0.033 can be achieved with a TCE differential of only about $5.5 \times 10^{-7}$ per degree C. Also, the softening point temperatures of these two compositions would be compatible. The calculated beat length of such a fiber is 1.8 mm at 632 nm.

Since various effects for providing polarization retention are additive, adjacent core lamina may be employed which do not provide a large refractive index differential. However, when the effect of such a laminated core is combined with another effect such as the birefringence produced by stress rods, a single mode fiber having a suitably low beat length can be fabricated. For example, in order to achieve certain optical properties such as low loss transmission at long wavelengths, it may be desirable to employ pure silica and silica doped with 7 mole percent $GeO_2$ as the laminae materials. Although the refractive index differential is only about 0.01 a suitable polarization retaining fiber could be fabricated by combining such a laminated core with stress rods as taught in U.S. Pat. No. 4,395,270.

Whereas some specific compositions have been disclosed by way of example, there is not intention of limiting the invention to the disclosed compositions. The core laminae must be formed of high purity glass and adjacent laminae must posses different refractive indices. If silica is employed as the base glass, there are many suitable materials besides those disclosed above which can satisfactorily be used as a core dopant alone or in combination with each other. These include, but are not limited to, titanium oxide, tantalum oxide, tin oxide, niobium oxide, zirconium oxide, aluminum oxide and lanthanum oxide. Also, the base glass is not limited to $SiO_2$. For example, metal halide glasses for use in optical waveguide fibers are disclosed in U.S. Pat. No. 4,378,987.

We claim:

1. In a method of forming an optical fiber comprising the steps of
   providing an elongated core structure,
   applying a layer of cladding glass to said core structure, and
   forming an optical fiber from the resultant preform, the step of providing a core structure being such that it comprises
   (a) providing a substrate,
   (b) forming on said substrate a laminated glass structure, adjacent glass lamina of the laminated glass structure having different refractive indices, and
   (c) removing one or more azimuthally asymmetric laminated core structures from the laminated glass structure.

2. The method of claim 1 wherein the step of (b) forming comprises depositing a plurality of layers of glass soot on said substrate, said glass soot comprising a base glass and at least one dopant for changing the refractive index of said base glass, the concentration of said dopant varying throughout the thickness of each of said layers, and consolidating said plurality of layers to form a core structure having a plurality of laminae of a first refractive index separated by a plurality of laminae of a second refractive index different from said first refractive index.

3. A method in accordance with claim 2 further comprising the step of severing the composite of dense glass layers to form a plurality of core structures.

4. A method in accordance with claim 2 wherein the step of (b) forming comprises directing toward said substrate a first soot stream of a first composition, moving said substrate with respect to said stream as necessary to form a uniform soot coating on said substrate, directing toward said substrate a second soot stream of a second composition different from said first composition, moving said substrate with respect to said second soot stream as necessary to form a second uniform soot coating on said first coating, repeating the steps of directing said first and second soot streams toward said substrate, consolidating said soot to form dense glass layers, adjacent ones of which have different refractive indices, and removing said substrate from the composite of dense glass layers.

5. A method in accordance with claim 4 where said removing comprises the step of severing the composite of dense glass layers to form said core structures.

6. A method in accordance with claim 1 wherein the step of providing a substrate comprises providing a cylindrical substrate and wherein the step of (b) forming comprises directing toward said cylindrical substrate a first soot stream of a first composition, rotating and translating said substrate with respect to said stream as necessary to form a uniform soot coating on said substrate, directing toward said substrate a second soot stream of a second composition different from said first composition, rotating and translating said substrate with respect to said second stream as necessary to form a second uniform soot coating on said first coating, repeating the steps of directing said first and second soot streams toward said substrate, consolidating said soot to form dense glass layers, adjacent ones of which have different refractive indices, and removing the composite of dense glass layers from said substrate.

7. A method in accordance with claim 6 wherein the step of removing one or more elongated core structures comprises core drilling said core structures from said composite of dense glass layers.

8. A method in accordance with claim 7 wherein said substrate is removed prior to the time that said soot layers are consolidated.

9. A method in accordance with claim 7 wherein said substrate remains in said composite structure during the time that said soot layers are being consolidated.

10. A method in accordance with claim 6 wherein the step of removing one or more elongated core structures comprises removing said substrate from said composite of dense glass layers and sawing said composite into a plurality of elongated core structures.

11. A method in accordance with claim 10 wherein said substrate is removed prior to the time that said soot layers are consolidated.

12. A method in accordance with claim 10 wherein said substrate remains in said composite structure during the time that said soot layers are being consolidated.

13. A method in accordance with claim 1 wherein the step of providing a substrate comprises providing a planar substrate, and wherein the step of (b) forming comprises directing toward said substrate a first soot stream of a first composition, moving said substrate with respect to said stream as necessary to form a uniform planar soot coating on said substrate, directing toward said substrate a second soot stream of a second composition different from said first composition, moving said substrate with respect to said second stream as necessary to form a second uniform planar soot coating on the surface of said first soot coating, repeating the steps of directing said first and second soot streams toward said substrate to form additional soot coatings, adjacent ones of which have different compositions.

14. A method in accordance with claim 13 further comprising the step of consolidating said soot layers to form a plurality of dense glass layers, adjacent ones of which have different refractive indices.

15. A method in accordance with claim 14 further comprising removing said substrate from said composite of dense glass layers.

16. A method in accordance with claim 15 further comprising the step of removing sharp corners from the resultant laminated dense glass core structure.

17. A method in accordance with claim 15 where said removing comprises the step of severing the composite of said plurality of dense glass layers into a plurality of elongated core structures.

18. A method in accordance with claim 17 further comprising the step of removing sharp corners from the resultant laminated dense glass core structure.

19. A method in accordance with claim 18 wherein the step of removing said corners comprises rotating said core structure about its longitudinal axis in an abrasive slurry.

20. A method in accordance with claim 1 wherein the step of (b) forming comprises depositing a plurality of layers of glass soot on said substrate, whereby said azimuthally asymmetric laminated core structures are porous, said method further comprising the step of consolidating each of said porous core structures to form core structures which comprise a dense glass.

21. A method of forming an optical fiber comprising the steps of
   forming on a substrate a laminated glass structure, adjacent glass lamina of the laminated glass structure having different refractive indices
   severing from the laminated glass structure an elongated azimuthally asymmetric laminated glass core structure, applying a layer of cladding glass to said core structure, and forming an optical fiber from the resultant preform.

22. A method of forming an optical fiber comprising the steps of forming on a substrate a porous, laminated glass structure, adjacent lamina of the laminated glass structure having different refractive indices, severing from the laminated glass structure an elongated, azimuthally asymmetric laminated porous glass core structure, consolidating said porous glass core structure to form a dense glass core structure, applying a layer of cladding glass to said dense glass core structure, and forming an optical fiber from the resultant preform.

* * * * *